ADJUSTABLE HEAD MOUNTING DEVICE

Filed March 23, 1956 2 Sheets-Sheet 1

INVENTORS:
Robert W. Hanmer
Willard C. Rosener

BY Earl Beust
Louis A. Kline
John J. Matlago
THEIR ATTORNEYS

ADJUSTABLE HEAD MOUNTING DEVICE

Filed March 23, 1956 2 Sheets-Sheet 2

INVENTORS:
Robert W. Hanmer
Willard C. Rosener

BY Carl Beust
Louis A. Kline
John T. Matlago
THEIR ATTORNEYS

United States Patent Office 2,997,360

Patented Aug. 22, 1961

2,997,360

ADJUSTABLE HEAD MOUNTING DEVICE

Robert W. Hanmer, Lawndale, Calif., and Willard C. Rosener, Dayton, Ohio, assignors to The National Cash Register Company, Dayton, Ohio, a corporation of Maryland Filed Mar. 23, 1956, Ser. No. 573,480

10 Claims. (Cl. 346—74)

This invention relates to mounting means for magnetic heads and more particularly to mounting devices for enabling heads to be precisely and safety positioned relative to movable magnetizable surfaces, such as the surface of a rotating drum.

It is a well-known practice to employ a rotating drum, having a plurality of magnetic heads positioned about the surface thereof, as a memory for a digital computer. When used in this manner, it is highly desirable to provide the heads with adjustable mounting devices so as to enable them to be rapidly positioned and safely maintained in position with respect to each other and with the surface of the drum while the equipment is in operation. It is further highly desirable to have the heads maintained in a position as close to the drum surface as possible. However, when the heads are rigidly fixed in position with a slight clearance relative to the drum surface, if for any reason the drum expands due to temperature rise or severe vibration of the equipment, physical contact between the heads and the oxide surface of the drum can cause unavoidable wear. It has thus been the practice heretofore, e.g., in vertically rotating drum installations, to hold the head mount in its radial position by a small frictional force so that the head can easily move out to a new safe position if the head should happen to make contact with the drum surface. This arrangement, however, has not been totally satisfactory since the head mount has a tendency to creep outward and the rotational setting of the head is subject to variation as a result of normal vibrational forces experienced in operation of the equipment.

The head mounting device of the present invention thus provides for holding the cylindrical mount for the head in a sleeve provided in a barrel surrounding the drum, by an adjustable radial positioning means which produces sufficient inward force to maintain the head in a fixed radial position relative to the surface of the drum when subjected to normal vibrational forces, as encountered during the operation of such equipment. However, if the force on the head should become excessive, due to actual physical contact between the head and drum surface, the radial positioning means allows the head mount to adjust itself radially outward, thus preventing unavoidable wear and damage to these components. Since it is also necessary to provide a rotational adjustment for the head mount, the means for maintaining the rotational setting is arranged to permit the head mount to have a freedom of motion in the radial direction at all times, so that the radial adjustment described can be accomplished without interference. Furthermore, provision is made for rapidly adjusting the head mount tangentially to the surface of the drum by sliding the flange of the mounting sleeve along a recessed track machined on the surface of the barrel, for example.

It is, accordingly, an object of this invention to provide a head mounting device which can be used to effect rapid, precise adjustments of magnetic heads relative to the surface of a moving storage medium.

Another object of this invention is to provide a head mounting device with a means for radial adjustment which will maintain a head setting against normal vibrational forces, but which will allow outward repositioning of the head to a new setting if greater forces are encountered, due, for example, to expansion of the drum.

Another object of this invention is to provide a head mount assembly that facilitates tangential adjustment of a head about the surface of a storage drum by use of a recessed track on the drum barrel.

Another object of this invention is to provide a head mounting device which can be quickly and precisely adjusted but which lends itself to simple construction and to ease of assembly.

These and other objects of the invention relating particularly to details of construction and operation will become apparent from the following description read in conjunction with the accompanying drawings, in which.

Figures 1, 2A, 6:
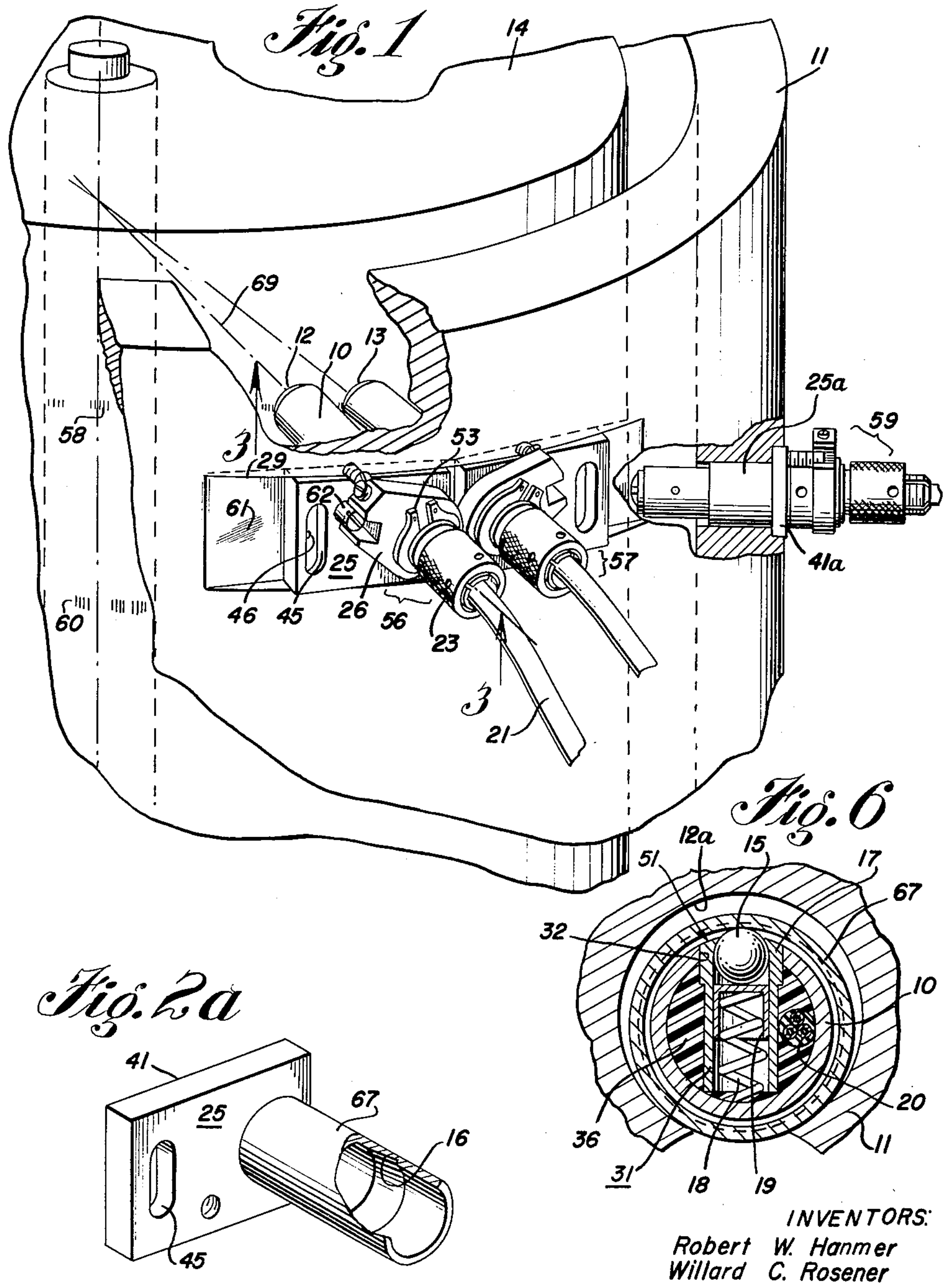
FIG. 1 is a perspective view showing how the head mounting devices, including a pair positioned to form a data recirculation line, are held in a barrel encompassing the drum.

FIG. 2*a* is a perspective view of the track follower.

Figures 2, 3, 4, 5:
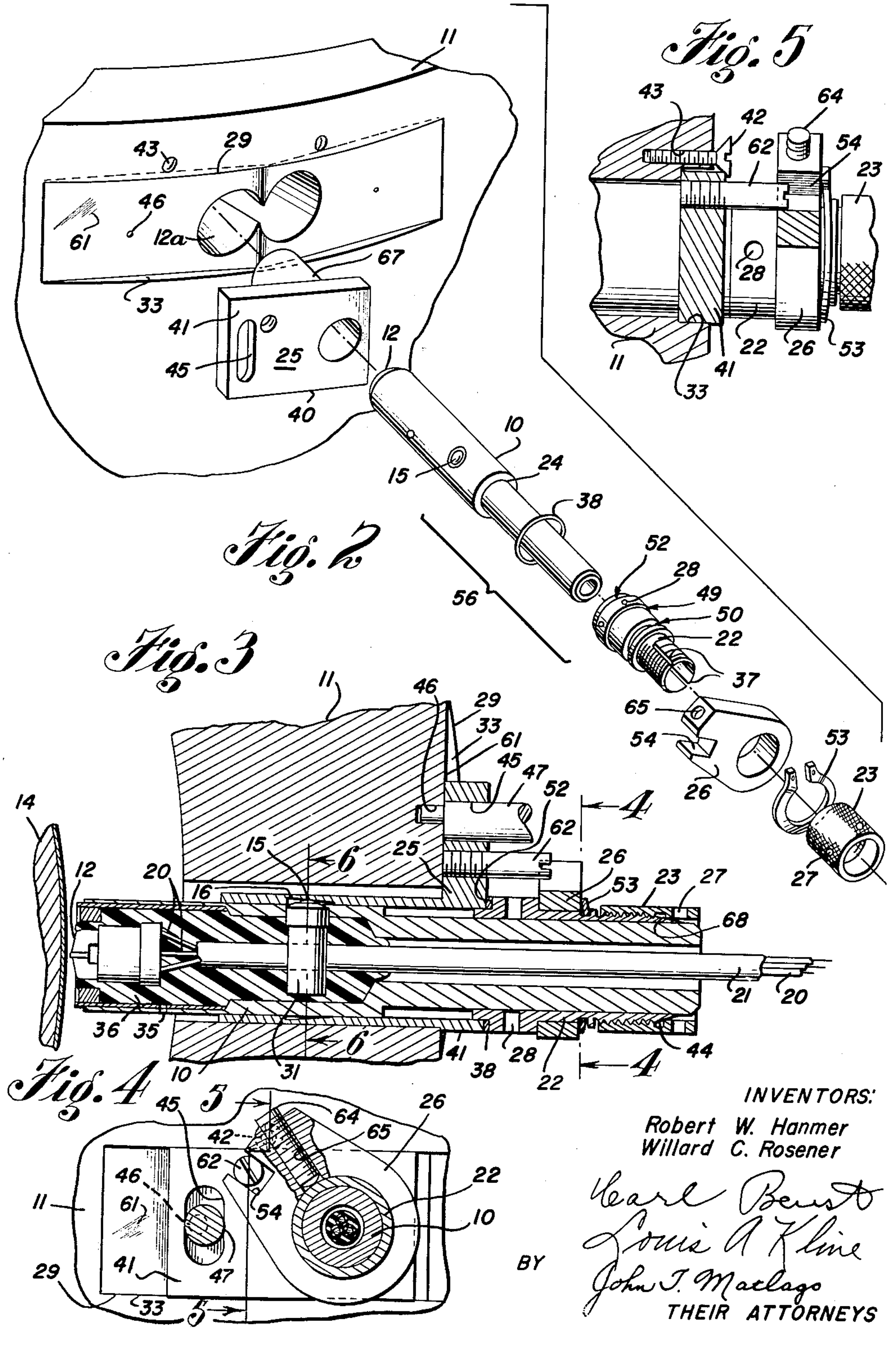
FIG. 2 is an exploded perspective view of the head mounting device.

FIG. 3 is a sectional view of the head mounting device.

FIG. 4 is a sectional view showing the details of the rotational setting means.

FIG. 5 is a sectional view showing how the mounting device is locked in position on a track provided on the barrel.

FIG. 6 is a sectional view showing the retaining means for the head mount.

Referring first to FIG. 1, a perspective illustration of a magnetic type drum memory, typical of those used with a digital computer, is shown. Barrel 11 encloses a rotating drum 14, the peripheral surface of which has a coating of ferric oxide for storing information signals. The head mounting devices of the present invention, designated by reference numerals 56 and 57, are held in barrel 11 so as to enable magnetic heads 12 and 13, respectively, attached to the inner ends thereof, to cooperate with channel 58 of drum 14 to form a recirculating or feedback loop well understood in the computer art. The head mounting devices 56 and 57 are provided with adjustments so as to be able to properly position attached heads 12 and 13 relative to each other and to the surface of drum 14. More specifically, each head mounting device provides for adjustment of a head along a path tangential to the surface of drum 14, along the radial axis 69 of the drum, and rotational about the radial axis 69 of the drum. Read head mounting device 59, which cooperates with a clock channel 60 to generate timing signals as previously discussed, has a function similar to devices 56 and 57, except that no provision is made for tangential adjustment, in this instance.

Reference will next be made to FIG. 2, showing an exploded view of head mounting device 56 which is comprised of track follower 25, head mount 10, collet 22, rotational stop 26, and locking collar 23. The following detailed description of these parts will also make reference to FIG. 3, showing a sectional view of the parts assembled together. Track follower 25, by which head mount 10 is positioned on barrel 11, is comprised of a mounting sleeve 67 provided with an off-center rectangular flange 41, as shown in FIG. 2. Sleeve 67 of track follower 25 is inserted in a hole **12*a* drilled in a flat surface 61 milled on track 29 such that flange 41 is positioned against the flat surface 61. Hole 12*a* is drilled oversize to allow rectangular flange 41 to slide along flat surface 61** while being held in position in the barrel.

Head mount 10 is cylindrical in form with approximately one-half the length thereof turned to a smaller diameter than the other. As shown in FIG. 3, magnetic head 12 is inserted within the opening in the large diameter portion with its leads 20 wound together to form a composite lead 21 which passes around a ball retaining mechanism 31 and out through an opening provided in the small diameter portion, ultimately connecting to a suitable plug-in type terminal (not shown). An injection hole 35 is drilled through the wall of head mount 10 so that a suitable potting material 36 can be forced into the space surrounding ball retaining mechanism 31, magnetic head 12, and wire leads 20. Upon setting of the potting material 36, all the above parts are fixed in a permanent position inside head mount 10 so as to be capable of withstanding shocks or vibrations.

Head mount 10 is initially positioned in sleeve 67 of track follower 25 with the head 12 contacting the surface of the drum 14. When in this position, the shoulder 24 of head mount 10, formed by the smaller diameter thereon, is well within the opening provided by sleeve 67. Collet 22 has a sliding fit on head mount 10 and in final assembly is positioned with its shoulder 52 spaced from the upper surface of track follower 25 by spacer 38. A rotational stop 26 is next slipped over the end of a collet 22 and held against shoulder 49 thereof by spring lock 53 which snaps a suitable groove 50 provided on collet 22. This stop 26 provides for setting and locking head mount 10 in any desired rotational position about radial axis 69, and at the same time permits the head mount 10 to be adjusted radially, as will be later described. Knurled collar 23 having internal threads is then positioned to engage the threaded end of collet 22. Collet 22 is provided with slots 37 such that the internal shoulder 68 of collar 23, upon being advanced thereon, tightens against beveled end 44 of the collet, thus serving to squeeze the slotted threaded end of collet 22 to lock it in position on the head mount 10. Having once locked the collet on the head mount 10, the head mount 10 can be removed from the track follower 25 so that spacer 38, having a thickness of .001 inch, for example, can be placed between the surface of flange 41 and the shoulder 52 prior to the head mount being reinserted in the track follower 25. In this way the head 12 can be positioned a desired distance from the surface of drum 14.

A more detailed description will next be given of the construction and function of track follower 25 of head mounting device 56. First to be noted in FIG. 2 is that the flat surface 61 is milled on barrel 11 at a tangent to the surface of drum 14. One side 33 of the milled flat surface 61 provides a guide against which side 40 of flange 41 of track follower 25 is held by the conical surface of the head of a flat headed screw 42 bearing on the opposite edge of flange 41, as shown in detail in FIG. 5. When screw 42 is tightened into threaded hole 43, its conical surface forces flange 41 both against side 33 and flat surface 61 of track 29. This arrangement not only holds flange 41 in any set position along track 29 but also allows precise sliding movement of flange 41 along track 29, while be heing held firmly in the path of the track.

The method of precisely adjusting flange 41 along the path of track 29 can best be understood by reference to FIGS. 3 and 4 showing an adjusting slot 45 bored in flange 41 with its longitudinal center line at right angles to the center line of track 29. Into slot 45 an eccentric wrench 47 may be inserted with its off-center pin positioned into a stationary hole 46 (FIG. 2) drilled in the flat surface 61 of track 29. Turning of ececntric wrench 47 on its off-center pin forces the body of wrench 47 against the large flat inside surface of slot 45, thus precisely moving track follower 25 along track 29. This results in the desired precise tangential adjustment of magnetic head 12 mounted on the end of head mount 10.

It should be understood that collet 22, fixed on head mount 10, serves as a stop preventing further radial inward movement of head mount 10 from its desired setting. However, when assembled in this manner, head mount 10 can move outward if drum 14 happens to physically contact magnetic head 13, due, for example, to thermal expansion of drum 14. In order to prevent head mount 10 from moving outward too easily, however, due to external forces, such as normal vibrational forces, for example, the retaining mechanism 31 shown in detail in FIG. 6 is provided. This retaining means is comprised of a spring loaded ball 15 which projects out of the large diameter cylindrical surface of head mount 10 and presses against tapered surface 16 (FIG. 2*a*) turned on the internal surface of the mounting sleeve of track follower 25.

Referring to FIG. 6, retaining mechanism 31 comprises spring loaded ball 15, spring cup 19, and coil spring 18, all held in a ball retainer 17 which is inserted into hole 32 drilled in head mount 10. Retaining mechanism 31 is securely held in hole 32 with the exposed surface 51 of ball retainer 17 flush with the outer surface of head mount 10. Spring loaded ball 15 projects out of the surface of head mount 10 so as to contact tapered surface 16 turned on the internal surface of the sleeve 67 of track follower 25 (FIG. 2*a*). When assembled in this manner, tapered surface 16 provides a small resultant inward force on the retaining ball 15, which reduces the resistance with which head mount 10 can move to its inwardly adjusted position, as compared to its resistance to outward movement. Thus, when the head mount 10 is subjected to normal vibrational forces, as encountered from rotation of drum 14 or from other sources, it tends to move radially inward, since this in the direction of least resistance. Inasmuch as it is desirable to have head mount 10 held in position primarily by the resultant inward force produced by retaining ball 15 contacting tapered surface 16, a low tolerance fit is provided between the surface of head mount 10 and the inside surface of track follower sleeve 67. It should now be clear that tapered surface 16 is bored in the inside surface of the mounting sleeve at an angle suitable for retention of head mount 10 against outward movement, or creeping, during operation of the equipment.

Since head mount 10 must be rotationally adjustable about the radial axis, rotational stop 26 holds head mount 10 in position after this adjustment has been made and, at the same time, allows head mount 10 to radially adjust itself as the occasion demands during operation of the equipment. Referring to FIGS. 4 and 5, rotational stop 26 is held from turning relative to the track follower 25 by a pin 62 screwed into a tapped hole provided on flange 41. The end of pin 62 fits in an open slot 54 milled in the edge of stop 26. Head mount 10, with collet 22 tightened firmly about its surface, may then be fixed permanently in an adjusted rotational position by advancing set screw 64 into tapped hole 65 provided in the side of stop 26 until the end of screw 64 bears firmly against the cylindrical surface of collet 22.

Referring to FIGS. 1 and 3, the method of setting and locking the adjustments of the head mounting device will now be summarized. To adjust the radial distance between head 12 and drum 14, head mount 10 is inserted into track follower sleeve 67 until magnetic head 12 rests against the surface of drum 14. Collet 22 is then slipped over head mount 10 until shoulder 52 thereof is positioned against the upper surface of flange 41. Collet 22 is then fixed in position on the surface of head mount 10 by advancing threaded collar 23 over the threaded slotted end of collet 22. For this operation of tightening collar 23 on collet 22, spanner wrenches are inserted in holes 27 and 28 provided in collar 23 and collet 22, respectively. Head mount 10 is then removed and spacer 38 is inserted on the end of collet 22 to bear on the shoulder 52 thereof, prior to reassembly. This sets and maintains the desired gap between magnetic head 12 and the surface of drum 14. Spring loaded ball 15 pressing against tapered surface 16 provides sufficient inward force to prevent head mount 10 from moving outward from this adjusted position under the normal vibrating forces encountered during operation of the equipment. However, in case of interference caused, for instance, by thermal expansion of the drum, head mount 10 can be forced to move radially outward against the resultant inward force of ball 15 on tapered surface 16, to a new radial position, without causing damage to the equipment.

The gap of magnetic head 12 must be properly set relative to the center line of the channel on the drum 14 to maximize the signal sensed by the head. This adjustment is accomplished by rotating the knurled collar 23 secured to the head mount 10 until magnetic head 12 is in its desired position, as indicated, for example, by an oscilloscope showing of the signals sensed while the drum 14 is rotating. Set screw 64 is then advanced in tapped hole 65 of rotational stop 26 until the tip thereof bears against the surface of collet 22, thus locking the head mount 10 to prevent any rotational movement thereof due to vibration or other forces. It should be clearly understood that providing rotational stop 26 with a slot 54 in which pin 62 can slide enables the radial adjustment previously described to be made, during operation of the equipment, without interference from the rotational setting.

Tangential adjustment of track follower 25 is also best made while the drum is rotating and a visual indication of the spacing of the heads is available by viewing the sensed pulses on an oscilloscope screen. To make this adjustment, flat headed screw 42 (FIG. 5) is loosened from flange 41 and the pin on the end of eccentric wrench 47 is inserted into hole 46. The wrench is then turned until the track follower 25, and consequently the entire head mount 10, has been moved along track 29 the desired distance. Thus, by moving flange 41, head 12 is moved tangentially to the surface of drum 14 which results in an increase or decrease in the spacing of the head relative to an adjacent head on channel 58. It should be noted that flat surface 61 on track 29 is tangent to the surface of drum 14, rather than arcuate, and so moving of flange 41 changes the set radial spacing between magnetic head 13 and the surface of drum 14, but this deviation is of such small magnitude due to the short tangential movement required for adjustment that the strength of the output signal is not appreciably diminished. Head mount 10 is firmly set in its adjusted position by tightening flat headed cap screw 42. This tangential adjustment as well as the radial and rotational adjustments are all independent of each other, one not interfering with the setting of another, thus the arrangement described allows rapid and accurate setting of all three adjustments, by eliminating any trial and error process.

As shown in FIG. 1, fixed head mounting device 59 is similar to head mounting devices 56 and 57 with the exception of the requirement of the means for tangential adjustment along a track. For this device, a modified mounting sleeve **25*a* having a flange 41*a* is inserted forcibly into a suitable countersunk hole drilled in barrel 11. Flange 41*a* is here constructed without an adjusting slot 45, as this slot is only required for tangential adjustment. Head mount 10 is then inserted in the modified mounting sleeve 25*a* and means such as those already described for mounting device 56** are provided for adjusting it radially and rotationally, as shown.

Having once effected the adjustments as described above, the equipment can be operated and, due to the small inward force created by the spring loaded ball 15 bearing on the tapered internal surface 16 of sleeve 67, the head mount 10 will maintain its original setting although the equipment is subjected to slight vibrational forces. However, if for any reason the drum should expand or the vibrational forces become excessive, the head mount 10 will be able to move radially outward against the force of spring loaded ball 15 on head mount 10 and assume a new position, thus avoiding undue wear to the equipment.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Apparatus for positioning a magnetic head relative to the surface of a rotating drum memory comprising: a cylindrical housing having the magnetic head extending out of one end thereof; a spring loaded ball projecting out of the body of said housing; a sleeve positioned in an opening provided on a barrel surrounding said drum, said sleeve having a tapered internal surface, and said housing being positioned in said sleeve with the spring loaded ball thereof in contact with said tapered surface.

2. Apparatus for positioning a magnetic head relative to the magnetizable surface of a rotating drum comprising: a cylindrical housing having the magnetic head affixed to one end thereof; a spring loaded ball projecting out of the body of said housing; a sleeve held in an opening provided on a barrel surrounding said drum, said sleeve having a tapered surface on the inside diameter thereof contacting the spring loaded ball of said housing positioned therein, said sleeve also having a flange confined to slide along a recessed track provided on the surface of said barrel; and a stop for preventing said housing from rotating relative to said sleeve, said stop permitting said housing to have a freedom of movement in the radial direction, whereby said housing can move radially outward against the force of said spring loaded ball while maintaining the rotational setting of said housing.

3. An adjustable head mounting device for a storage drum comprising: a main support positioned about at least a portion of the surface of said drum; a cylindrical housing; a magnetic head affixed to the end of said housing; a sleeve positioned in an opening provided on said support, said sleeve having a flange confined to tangential movement on a flat surface provided on said support; a collet stop on said housing by which said housing is set in a fixed radial inward position in said sleeve; a spring seated ball projecting out of the side surface of said housing to contact a tapered surface on the inner diameter of said sleeve, thereby producing a radially inward force on said housing; and a rotational stop having a slot engaging a pin on said flange for locking said housing in a rotational setting relative to said sleeve, whereby said cylindrical housing can adjust itself radially outward to a new position only if the force on said head exceeds the radial inward force produced by said spring seated ball.

4. Apparatus for positioning a magnetic head relative to the surface of a rotating drum memory comprising: a cylindrical housing having a magnetic head extending from one end thereof; a spring-urged ball projecting out of the body of said housing; and a supporting structure for said housing provided with an opening having a tapered internal recess portion formed therein, said housing being positioned in said opening with the spring-urged ball thereof in contact with said tapered recess portion.

5. Apparatus for positioning a magnetic head relative to a moving magnetizable surface of a drum for maximum signal response comprising: a cylindrical housing; a magnetic head affixed to the end of said housing; mounting means in which said housing can be initially positioned with a minimum clearance relative to the surface of said drum, said mounting means and said housing including cooperative means for frictionally holding said housing in position so that it can be repositioned with the head having a slightly spaced relation to the surface of the drum as a result of being forced radially outward due to contact of the head with said moving surface, and said cooperative means including biasing means for continuously producing a force transversely to the direction of radial movement of said housing and means cooperating with said biasing means for producing a force which tends to move the housing radially inward toward its initial position in the event the apparatus is subjected to vibrational forces.

6. A head mounting device for a magnetic drum memory comprising: a tubular housing; a magnetic head affixed to the end of said tubular housing; a supporting member having a bore in which said tubular housing can be initially positioned such that said head has a minimum clearance relative to the surface of the drum; and a member carried by the tubular housing and in resilient engagement with the wall of the bore, said wall engaging member comprising a ball resiliently urged in a direction at right angles to the bore.

7. A head mounting device for a magnetic drum memory comprising: a tubular housing; a magnetic head affixed to the end of said tubular housing; a supporting member having a bore in which said tubular housing can be initially positioned such that said head has a minimum clearance relative to the surface of the drum; and a member carried by the tubular housing and in resilient engagement with the wall of the bore, said wall engaging member comprising a ball resiliently urged in a direction at right angles to the bore, and said wall provided with a recessed portion adapted to be engaged by the ball and so inclined with respect to the axis of the bore as to urge said tubular housing toward said initial position in said supporting member.

8. Apparatus for positioning a magnetic head relative to a magnetizable record medium movable past the head, comprising, in combination therewith: a head mount and a magnetic head affixed thereto; means including guide means effective to slidably support and guide said mount in movements of the latter toward and from the record medium and effective to limit movement of the mount toward the record medium but permitting movement of the mount away from the record medium; and interacting means comprised in part in said head mount and in part in said guide means and including a resilient member disposed to produce a force transversely to the direction of movement of said head mount and means disposed to engage said resilient member for producing a force tending to move said head toward said record medium wherein said interacting means is effective to produce frictional engagement between said head mount and guide means which resists motion of the head mount toward or from the record medium while concurrently effective to produce a force tending to move the head mount toward the record medium.

9. A head mounting device for use with a magnetic drum record medium, comprising: a head mount and a magnetic head affixed thereto; supporting means having a bore in which said head mount is slidably movable to and from an operating position along a path substantially normal to the surface of said magnetic drum record medium; and interacting means comprised in part in said mount and in part in said supporting means including a resilient member disposed to produce a force transversely to the direction of movement of said head mount and a tapered surface disposed to engage said resilient member for producing a component of force on said head mount toward said record medium, wherein the frictional engagement of said head mount within said bore resists motion of the head mount while said component of force is concurrently effective to tend to move said head mount toward said initial operating position.

10. Apparatus for positioning a magnetic head relative to the moving surface of a rotating drum comprising: a housing; a head having magnetic poles affixed to the end of said housing; and mounting means within which said housing is slidably held for permitting said housing to be moved radially outward by momentary contact of the poles of the head with said moving surface and held in a new position relative to the surface of the rotating drum so that the poles no longer touch the surface; and coacting cam and spring-urged follower means comprised in part in each of said housing and said mounting means, and continually effective to produce a force tending to move said head radially inwardly relative to said surface.

References Cited in the file of this patent

UNITED STATES PATENTS

| | | |
|---|---|---|
| 2,404,975 | Mathes | July 30, 1946 |
| 2,708,693 | Hendrickson | May 17, 1955 |
| 2,721,743 | Erickson et al. | Oct. 25, 1955 |
| 2,862,064 | Wallace et al. | Nov. 25, 1958 |
| 2,864,892 | Perkins | Dec. 16, 1958 |
| 2,915,593 | Brown | Dec. 1, 1959 |

FOREIGN PATENTS

| | | |
|---|---|---|
| 204,862 | Australia | June 16, 1955 |